United States Patent [19]
Corrigan et al.

[11] Patent Number: 5,737,332
[45] Date of Patent: Apr. 7, 1998

[54] DATA LINK CONTROL METHOD

[75] Inventors: Richard J. Corrigan; Camille Dozier, both of Schaumburg; Rachel Baumann, Downers Grove; Scott Chu, Northfield; Kurt Steinbrenner, Bartlett; David Ingham, Schaumburg, all of Ill.

[73] Assignee: Motorola, Inc., Schaumburg, Ill.

[21] Appl. No.: 594,462

[22] Filed: Jan. 31, 1996

[51] Int. Cl.$^6$ .................................................. H04L 12/54
[52] U.S. Cl. ................................ 370/394; 370/470
[58] Field of Search ............................ 370/359, 394, 370/419, 420, 470, 471, 473

[56] References Cited

U.S. PATENT DOCUMENTS

| | | | |
|---|---|---|---|
| 5,237,564 | 8/1993 | Lespagnol et al. | 370/470 |
| 5,271,009 | 12/1993 | Takano et al. | 370/471 |
| 5,408,469 | 4/1995 | Ophner et al. | 370/471 |
| 5,475,685 | 12/1995 | Garris et al. | 370/470 |

OTHER PUBLICATIONS

Generic Criteria for Version 0.1 Wireless Access Communications Systems (WAS) published by Bellcore, 1993 (TR–INS–0011313), including especially chapters 6 and 7. Personal Access Communications System Air Interface Standard J–STD–014 (PACS) published by Technical Ad Hoc Group 3 of the T1/T1A Joint Technical committee, including especially chapters 6 and 7.

U.S. Patent Application Ser. No. 08/564,837, Method and Apparatus for Multiple Access over Randomized Slots with Collision Detection in a Cable Telephony System, filed Nov. 29, 1995, Corrigan, Richard J. et al., our Docket No. CE02815R.

U.S. Patent Applicaton Ser. No. 08/564,983, Method and Apparatus for Assigning Communications Channels in a Cable Telephony System, filed Nov. 29, 1995, Corrigan, Richard J. et al., our Docket No. PD05578AM.

U.S. Patent Application Ser. No. 08/564,606, Method and Apparatus for Synchronizing Timing of Components of a Telecommunication System, filed Nov. 29, 1995, Burke, Timothy M. et al., our Docket No. PD05417AM.

*Primary Examiner*—Benedict V. Safourek
*Attorney, Agent, or Firm*—Aaron Bernstein; Jordan C. Powell

[57] ABSTRACT

A data link control method including receiving a message (30) for transmission over a cable communications system. The method determines a number of octets in the message (30). When the number of octets is less than or equal to a predetermined number of octets, the method sets a frame length (44) equal to the number of octets and transmits a frame (180) containing the message (30). When the number of octets is greater than the predetermined number, the messages (30) is segmented (32–42), each segment being identified in order with respect to the other segments. The method thereby provides for graceful communications resumption when the transmission of a message is interrupted before completion.

11 Claims, 6 Drawing Sheets

| | BITS | | | | | | | | OCTET |
|---|---|---|---|---|---|---|---|---|---|
| | 8 | 7 | 6 | 5 | 4 | 3 | 2 | 1 | |
| 182 { | 0 | 1 | —186 | | | | | | SC-1 |
| | 1 | 0 | 0 | 1 | 1 | 1 | 1 | 1 | SC-2 |
| | P/F | COMMAND/RESPONSE—212 | | | | N(R)—192 | | | SC-3 |
| | 198 MRI—202 | | | FRAME LENGTH—200 | | | | | SC-4 |
| 184 { | S-FRAME PAYLOAD. FCI=1 | | | | | | | | FC-1 CONT. FC-20 |

DATA LINK CONTROL METHOD

BACKGROUND

The present invention relates generally to communication systems and more particularly to a data link control method for a communication system.

Digital communications systems (e.g., a cable telephony system) typically require a method (protocol) for transporting messages between a pair of devices connected to the communication system. The devices usually have a procedure for establishing a communication link. The transmitting device often uses a method for dividing an outgoing message into several portions. Each portion forms a payload of a frame. The receiving device uses a reverse method to reassemble the message.

In present systems if a communication link is lost during a communication session, the transmitting device has to establish a new communication link. If the transmitting device was in the middle of sending a multiple frame message, the transmitting device has to re-send the whole message. This results from the fact that present systems have no way to differentiate between a re-established communication session and a new communication session.

Thus there exists a need for data link control method that is able to differentiate between a new and a re-established communication session.

DETAILED DESCRIPTION OF THE DRAWINGS

In summary the invention provides a method of controlling a digital data link. The method includes a message segmentation and reassembly procedure that does not require retransmission of the message if the communication link is interrupted during the transmission of the message. A control procedure provides for graceful suspension and resumption of a traffic channel. This control procedure works in combination with the segmentation and reassembly procedure to eliminate the retransmission of a message if the communication channel is interrupted. Finally, a frame structure (transmission procedure) is provided to allow the two devices communicating over the digital data link to communicate efficiently.

The invention will be described in connection with a cable telephony system. However, this is for illustration purposes only and the invention applies to any digital communication system. A cable telephony system according to the present invention has a centralized controller, called a cable control unit (CCU), that couples the cable telephony system to the Public Telephone Switched Network (PSTN). In addition, the cable telephony system according to the present invention has a plurality of cable access units (CAUs), that are located at the subscriber's premises. The CAUs route the data to and from variety of premise devices, including telephones and computers. The invention, in this application, relates to the data control link method that provides for the transmission of the messages between the CCU and CAU.

Figure 1:
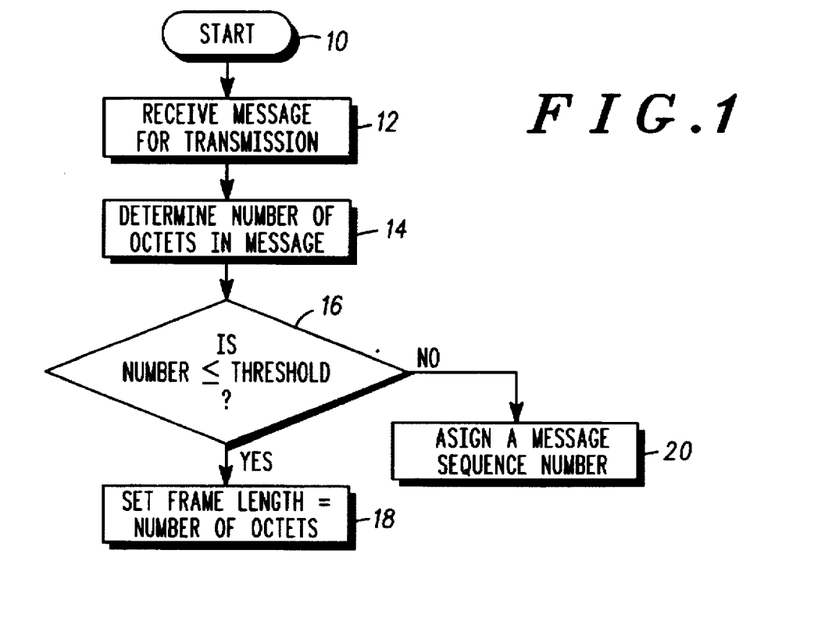
FIG. 1 is a flow diagram of the steps used in segmenting a message for transmission.

FIG. 1 is a flow chart of the steps used to segment a message for transmission between a pair of devices, such as a CAU and CCU in a cable communications system. The process starts, step 10, by one of the devices receiving a message for transmission at step 12. The device determines the number of octets in the message at step 14. An octet is a string of digital bits, eight bits long. Although the preferred method utilizes octets (i.e. a string of eight bits) it will be understood by those skilled in the art that any length message portion will be suitable, and as such may be referred to as a message portion rather than specifically as an octet. When the message is less than or equal to a predetermined number of octets at step 16, a frame length is set equal to the number of octets in the message at step 18. When the message is greater than a predetermined number of octets at step 16, a message sequence number is assigned to the frame at step 20.

Figure 2:
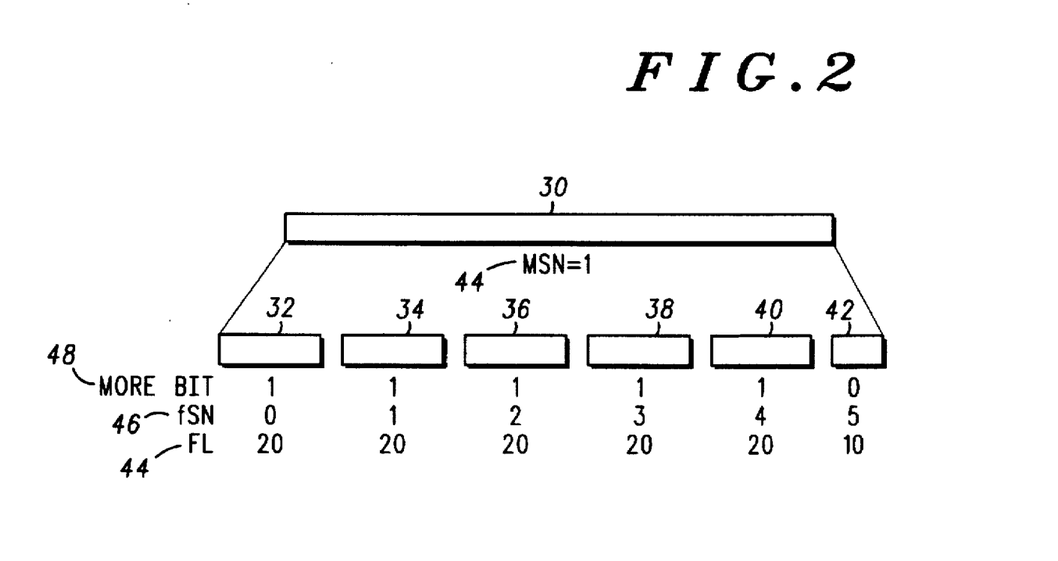
FIG. 2 is a schematic diagram of a message.

FIG. 2 is a schematic representation of how a message is segmented for transmission in multiple frames. The message 30 is composed of 110 octets and each frame (also called segment) in one embodiment can only carry twenty octets of message (payload). As a result the message 30 is broken into six segments 32–42. Every frame or segment of the message 30 is labeled with the same message sequence number 44. Each frame also has a parameter (the frame length) that is equal to the number octets of the message being carried by the frame. The first segment 32 is shown with a frame length (FL) 44 equal to twenty. The frame lengths for segments' two through five 34–40 are also twenty. The frame length of the sixth segment 42 is equal to ten. Each frame has a parameter called the frame sequence number (FSN) 46 that corresponds to the position of the segment in the message. Finally, the frame has a more bit parameter 48. The more bit 48 is set (i.e. is given the value 1) if the next frame contains data from the same message as the present frame.

Figure 3:
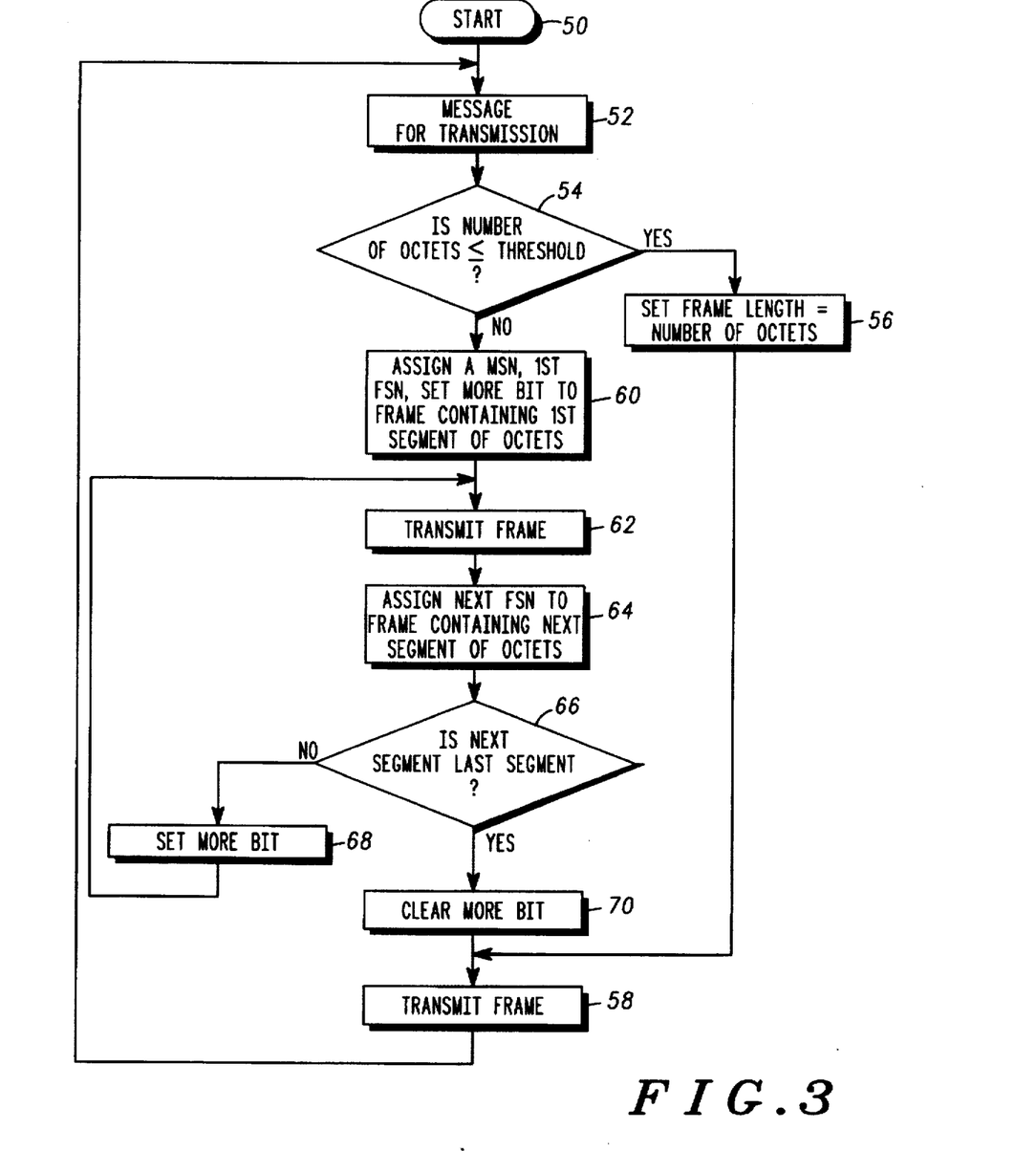
FIG. 3 is a flow chart of the steps used in segmenting a message for transmission.

FIG. 3 is a flow chart of the steps used to segment a message for transmission. The process starts, step 50, by the device (CCU or CAU) receiving a message for transmission at step 52. The message contains a message routing identifier that will be included in the frame. Next it is determined if the number octets in the message is less than or equal to a threshold, at step 54. When the number octets in the message is less than or equal to the threshold, the frame length is set equal to the number of octets in the message at step 56. The frame is then transmitted at step 58, and the process then returns to step 52.

When the number octets in the message is not less than or equal to the threshold the follow functions are performed; a message sequence number is assigned to all the frames carrying the message; a first frame sequence number is assigned to the first frame containing a first segment of octets in the message; a more bit is set in the first frame, step 60. The first frame is then transmitted at step 62. A next frame sequence number is assigned to the next frame containing the next segment of octets at step 64. The frame length in the next frame is set equal to a quantity of octets in the next segment of octets. At step 66, it is determined if the next segment is a last segment. When the next segment is not the last segment, a more bit is set at step 68. The frame is then transmitted at step 62. When the next segment is the last segment, the more bit is not set at step 70, and processing continues at step 58.

Figure 4:
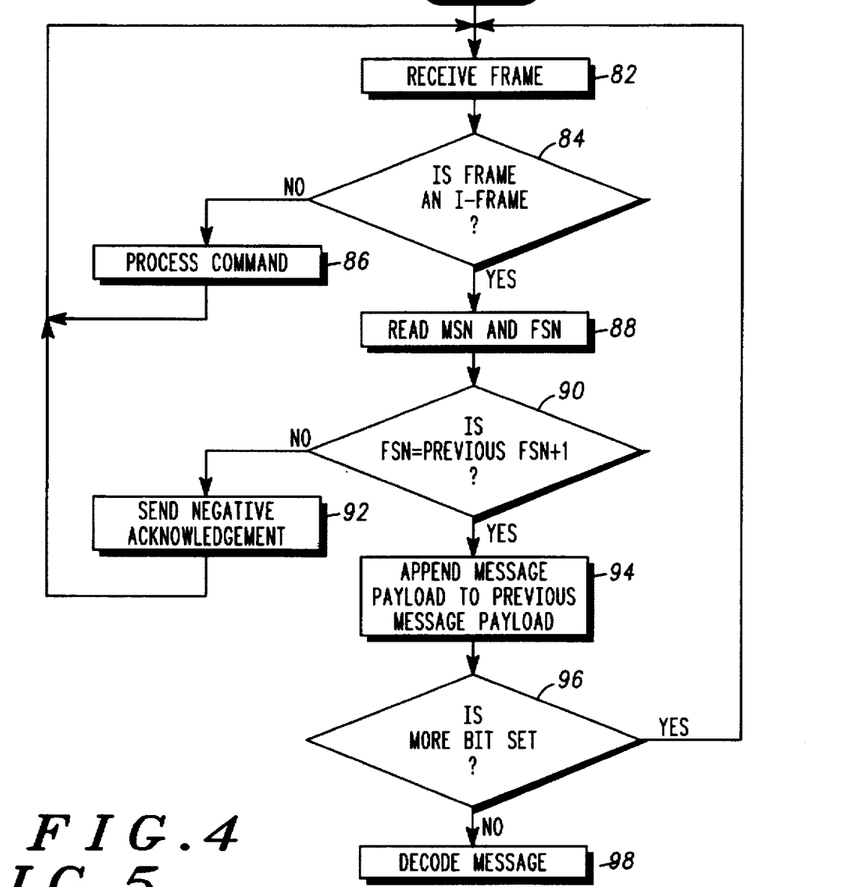
FIG. 4 is a flow diagram of the steps used in receiving a segmented message.

FIG. 4 is a flow chart of the steps used in reassembling a segmented message. The process starts, step 80, by receiving a frame at step 82. The frame will contain a message routing identifier, that will be used to route the reassembled message. Additionally, it will be understood by those of ordinary skill that such a frame is typically either an "information" frame, or a "command" frame, information frames containing user data such as voice data for phone calls, command frames containing systems operation and administration messages. Next it is determined if the frame is an information frame at step 84. When the frame is not an information frame, the command in the frame is processed at step 86 and processing returns to step 82. When the frame is an information frame, the message sequence number and the frame sequence number are read at step 88. At step 90, it is determined if the frame sequence number is one greater than the previous frame sequence number. When the frame sequence number is not one greater than the previous frame sequence number, a negative acknowledgment is sent at step 92. When the frame sequence number is one greater than the previous frame sequence number, the message payload is appended to the previous message payload at step 94. At step 96, it is determined if the more bit is set. When the more bit is set, the processing returns to step 82. When the more bit is not set, the message is assembled and routed to an appropriate device based on the received message routing identifier at step 98.

Figure 5:
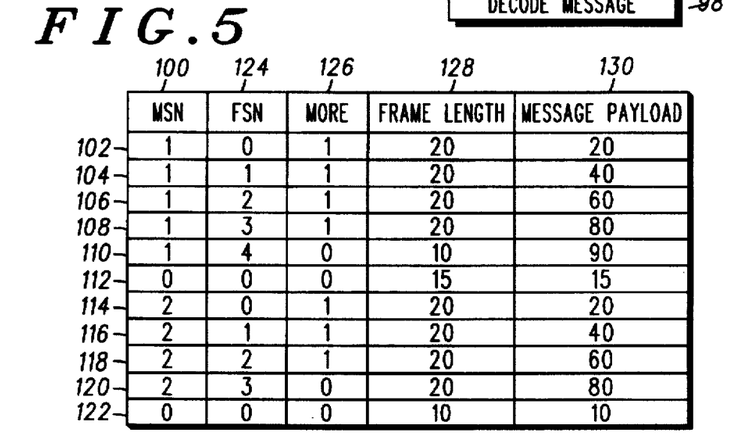
FIG. 5 is a chart showing a value for a plurality of parameters used in segmenting a message.

FIG. 5 is a chart showing how the parameters are set in one embodiment of the message segmentation method. The first column is the message sequence number 100. All the frames carrying information from the same message have the same message sequence number 100. The first message transmitted (MSN=1) extends from the first row 102 to the fifth row 110, or over five frames. The second message (MSN=0) is sent in a single frame as shown in sixth row. The chart shows how the parameters change over 11 frames 102–122 (rows) covering 4 messages. The second column is the frame sequence number (FSN) 124. The FSN 124 sequentially numbers each frame used to send part of the message. Thus the frame sequence number is zero in the first row 102 and moves up sequentially to having a value of four in the fifth row 110. The third column is a more bit 126. The more bit 126 indicates that the next frame carries a segment of the same message as the present frame. The fourth column is the frame length 128. The frame length 128 is equal to the number octets of the message are carried by the frame. The message payload 130 is not a parameter sent in the frame. This column shows the number of octets of the message that have been transferred after receiving the frame.

In the ordinary operation of a system in accordance with the present invention, a call or other data communication will occasionally be interrupted. The interruption may be due to loss of synchronization, noise interference, and/or an intentional frequency change (Alternate Link Transfer (ALT)) directed by the system. The call or data communication will need to resume as shamelessly as possible. FIGS. 6–9 show how such a communication link is resumed. When an ALT is initiated, the CCU will suspend the downlink portion of a communication link prior to sending an execute alternate command (ALT_EXEC), meaning that it will stop sending commands or responses in the downlink. "Downlink" will be understood to refer to communications transmitted by the CCU to the CAU, while "uplink" will be understood to refer to communications in the opposite direction. The CCU will continue to accept any uplink communication link transmissions, but hold off any response until after the communication link is reconnected, or restarted. When a CAU receives an ALT_EXEC, it will suspend the communication link. When the CAU has completed the ALT, the resume communication link procedure is used to re-establish the communication link. ALT procedures are described in more detail in copending U.S. patent applications, Ser. Nos. 08/564,837 and 08/564,983, entitled Method and Apparatus for Multiple Access over Randomized Slots with Collision Detection in a Cable Telephony System and Method and Apparatus for Assigning Communications Channels in a Cable Telephony System, filed on Nov. 29, 1995 and Nov. 29, 1995, respectively, which are incorporated here by reference.

Figure 6:
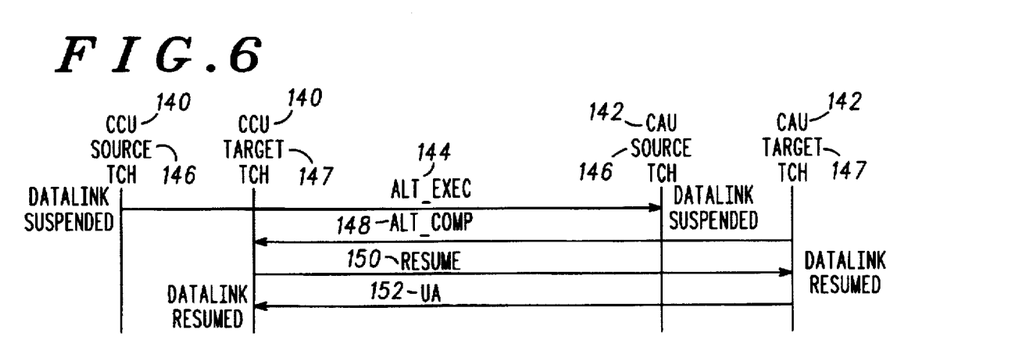
FIG. 6 is a signal diagram used in an immediate resume of a communication link.

FIG. 6 is a signal diagram used to resume a communication link. The communication link connects the cable control unit (CCU) 140 to the cable access unit (CAU) 142. When an execute alternate command is received, at step 144, the communication link is suspended on the source traffic channel 146. The CAU 142 then tunes to a target traffic channel 147. The CAU 142 then transmits a completed alternate message, at step 148. The CCU 140 responds by sending a resume command 150 over the target traffic channel 147. Either the CCU 140 or the CAU 142 can send the resume command 150 and broadly this is called resuming. The CAU 142 then sends an acknowledgment 152. The above process results in a graceful suspension and resumption of the traffic channel.

Figure 7:
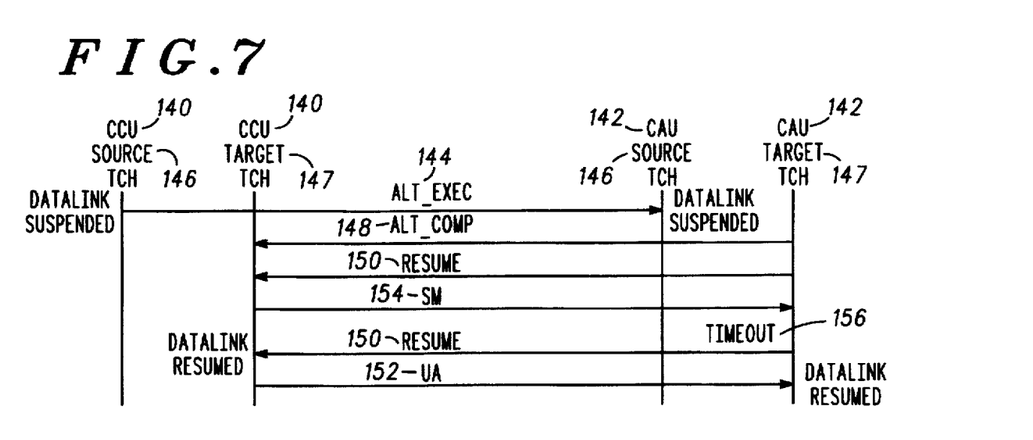
FIG. 7 is a signal diagram used in a delay resume of a communication link.

FIG. 7 is a signal diagram of an alternate scheme used to resume a communication link. In this case the CCU 140 responds to the resume command with a suspended mode message. This means the CCU 140 is not ready to resume the communication link. The diagram is similar to FIG. 6, the CCU 140 sends an execute alternate command 144. The CAU 142 responds with the completed alternate message 148. In this case however, the CAU 142 then transmits the resume command 150. The CCU 140 responds with a suspended mode message 154. The CAU 142 then waits a timeout period 156 and then transmits the resume command 150. The CCU 140 responds with an acknowledgment 152.

Figure 8:
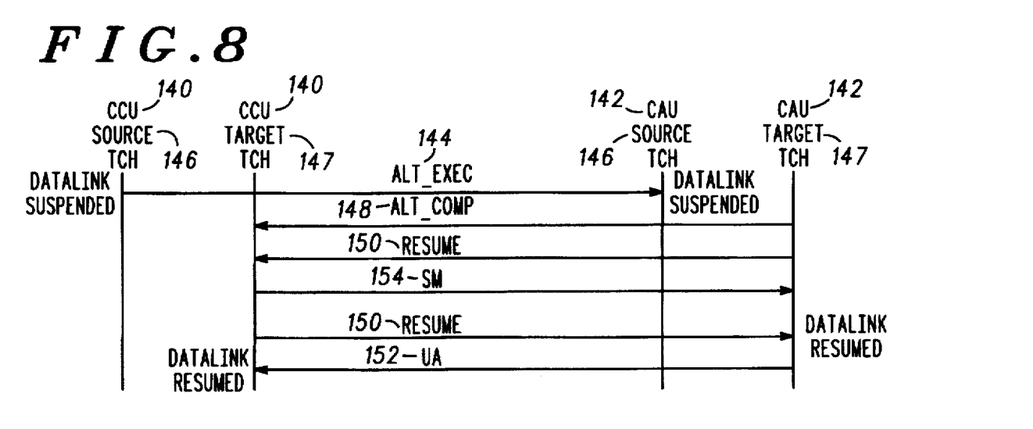
FIG. 8 is a signal diagram used in a delay resume of a communication link.

FIG. 8 is a signal diagram of yet another scheme used to resume a communication link. FIG. 8 is similar to FIG. 7 except that the CCU 140 is ready to resume the communication before the timeout period 156 is up for the CAU. Like FIGS. 6 and 7 the CCU 140 sends an execute alternate command 144. The CAU 142 responds with the completed alternate message 148. The CAU 142 then transmits the resume command 150. The CCU 140 responds with the suspended mode message 154. However, in this case the CCU 140 transmits the resume command 150 before the timeout period. The CAU 142 responds with an acknowledgment 152.

Figure 9:
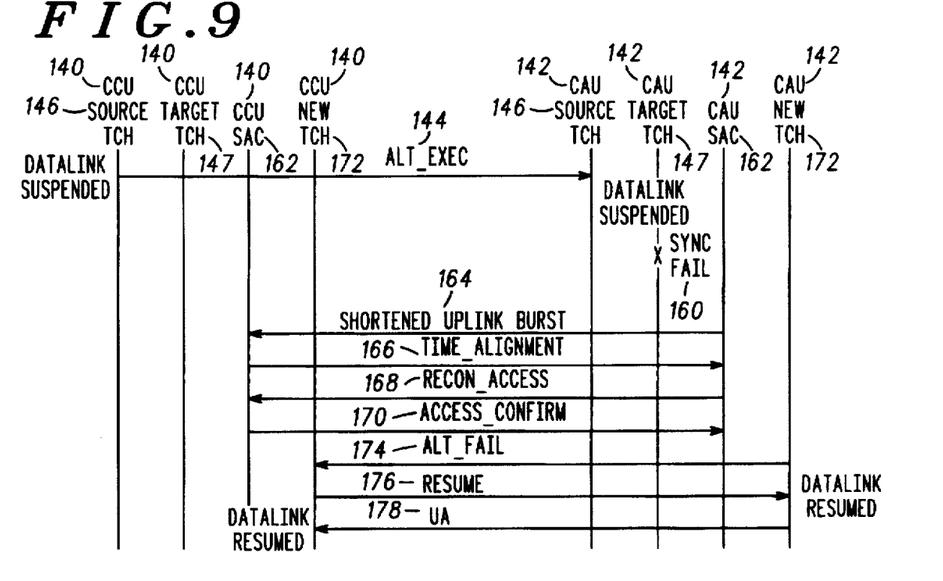
FIG. 9 is a signal diagram used in a reconnect and resume of a communication link.

FIG. 9 is a signal diagram of another scheme used to resume a communication link. In this case the CAU 142 is not able to acquire synchronization 160 on the target traffic channel 147. The CAU 142 then tunes to a system access channel 162 and transmits a shorten uplink burst 164. The CAU 142 then receives a time alignment command 166. Shortened burst and time alignment procedures are described in further detail in copending U.S. patent application Ser. No. 08/564,606 entitled Method and Apparatus for Multiple Access Over Randomized Sots with Collision Detection in a Cable Telephony System and filed Nov. 29, 1995, which is incorporated here by reference. The CAU 142 responds with a reconnection request 168. This request lets the CCU 140 know that this is not an initial connection request. This allows the CCU 140 to prioritize the connection over other initial connection requests. In addition, this notifies the CCU 140 that there was an ongoing communication session, which allows the CCU 140 and the CAU 142 to pickup where they were in the transmission stream. The CCU 140 responds with an access confirmed message 170, which directs the CAU 142 to a new target traffic channel (traffic channel) 172. The CAU 142 then tunes to the new traffic channel and transmits a failed alternative message 174. The CCU 140 responds with the resume command 176. The CAU 142 then transmits the acknowledgment 178. By combining the graceful suspension and resumption process of FIGS. 6–9 with the message segmentation method of FIGS. 1–4 it is no longer necessary to retransmit a message when the communication link is interrupted. It will be recognized by those of ordinary skill that implementing the inventive schemes illustrated in FIGS. 6–9 may be carried out in a variety of equally effective ways using well know programming, hardware and software methods.

Figure 10:
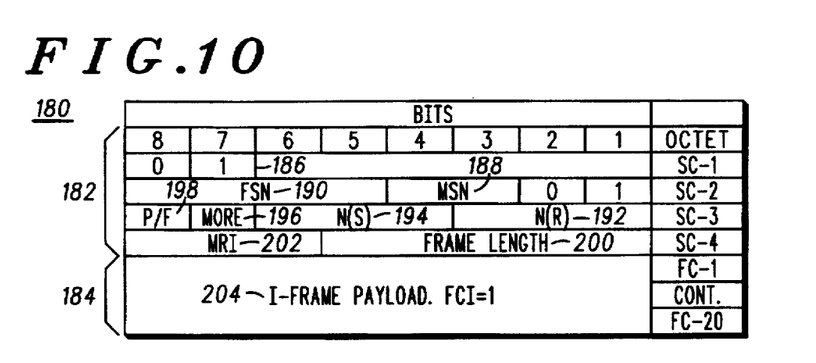
FIG. 10 is a schematic diagram of an information frame.
Figure 11:
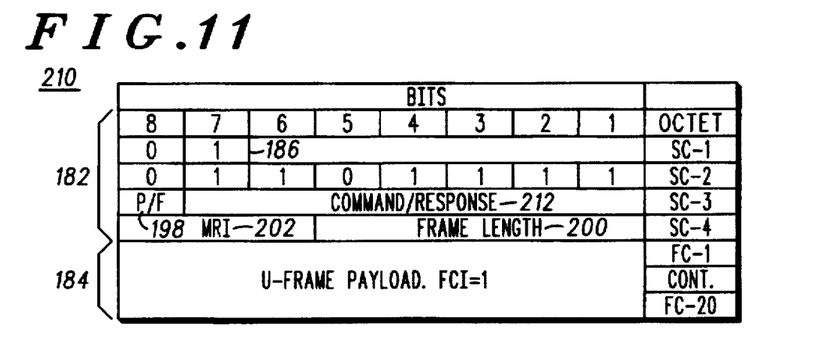
FIG. 11 is a schematic diagram of an unnumbered frame.
Figure 12:
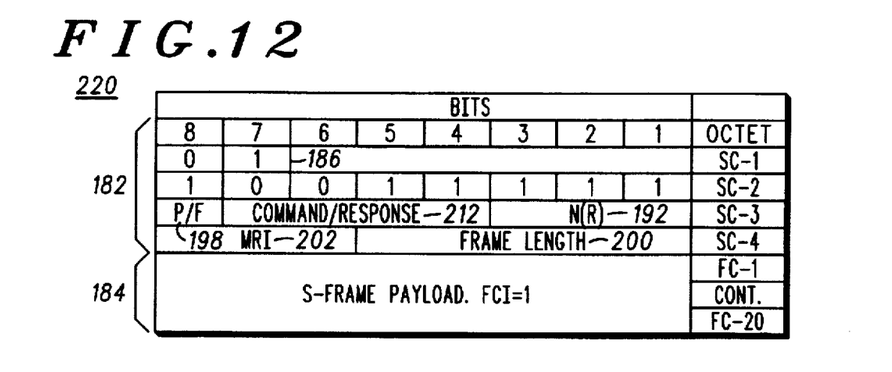
FIG. 12 is a schematic diagram of a supervisory frame.

FIGS. 10–12 show the three frame structures used to transport messages between the CCU and CAU. FIG. 10 shows an information frame (I-frame) that is used to carry payloads or data. FIG. 11 shows a supervisory frame (S-frame). Supervisory frames are used for error and flow control purposes. FIG. 12 shows an unnumbered frame (U-frame). Unnumbered frames are used for link setup and disconnect, and do not contain acknowledgment information. The frames are distinguished by unique slow channel encodings.

FIG. 10 is a schematic diagram of an information frame 180. The information frame 180 shows the time sequence in which the various parameters are transmitted. Broadly, the information frame 180 is divided into a slow channel 182 and a fast channel 184. The slow channel 182 is transmitted first followed by the fast channel 184. The slow channel 182 contains a bit pattern 186 indicative of the type of frame. The bit pattern 186 for the information frame 180 is '1010'. After the bit pattern 186 the message sequence number 188 is transmitted. Next the frame sequence number 190 is transmitted. Then a receiving number sequence N(R) 192 and a sending number sequence N(S) 194 are transmitted. The N(R) 192 and N(S) 194 are used by the automatic repeat request (ARQ) system. A more bit 196 is then transmitted. Next is a poll/final bit. (P/F) 198 is transmitted. This bit indicates if mandatory acknowledgment is required. The frame length 200 and message routing indicator 202 complete the slow channel 182. The fast channel 184 contains the message payload 204 (segment).

FIG. 11 is a schematic diagram of an unnumbered frame 210. The unnumbered frame 210 is comprised of the slow channel 182 and the fast channel 184. The bit pattern 186 that indicates the unnumbered frame is '1011110110'. This is followed by a command-response field 212. Then come the poll/final bit 198, the frame length 200 and the message routing identifier 202. The fast channel 184 is usually empty in the unnumbered frame.

FIG. 12 is a schematic diagram of a supervisory frame 220. The supervisory frame 220 is composed of the slow channel 182 and the fast channel 184. The bit pattern 186 that indicates the supervisory frame is '1011111001'. This is followed by the received number sequence N(R) 192. Then the command-response field 212 is transmitted. This is followed by the poll/final bit 198, the frame length 200 and the message routing identification 202. The frame structures in FIGS. 10–12 allow the data link control method to work efficiently and are critical to any of the features of the control data link method.

Figure 13:
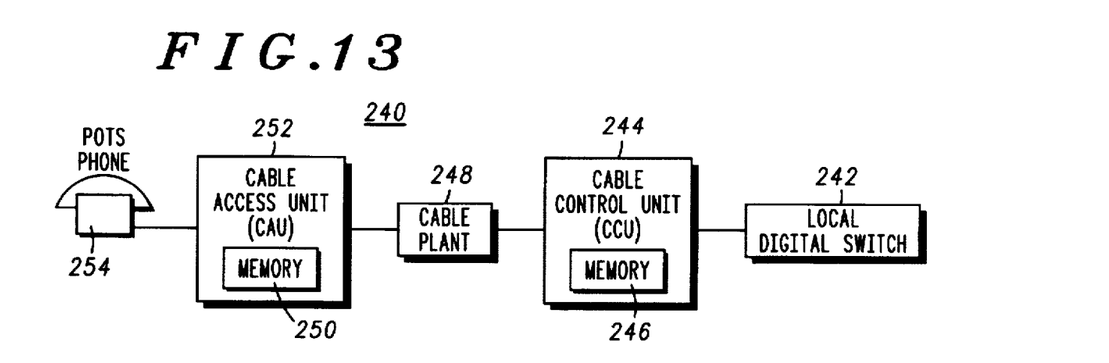
FIG. 13 is a schematic diagram of a cable communication system.

FIG. 13 is a schematic diagram of a cable communication system 240 capable of using the data link control methods described above. The communication system 240 connects to a local digital switch 242. The local digital switch 242 is part of the public switch telephone network system (PSTN). Connected to the local digital switch is a cable control unit (CCU) 244. The CCU 244 has a memory (machine-readable storage medium) 246 for storing machine-readable data. The memory can be a ROM chip, EPROM, hard disk or other computer storage medium. The memory will contain instructions to carry out the methods described with respect to FIGS. 1–12, as is well understood by those skilled in the art. The CCU 244 connects to a cable plant 248 that carries the digital data. A cable access unit (CAU) 250 connects to another end of the cable plant 248. The CAU 250 contains a memory 252. The CAU 250 translates the signals being transferred between a POTS (plain old telephone service) phone 254 and the cable communication system 240.

Figure 14:
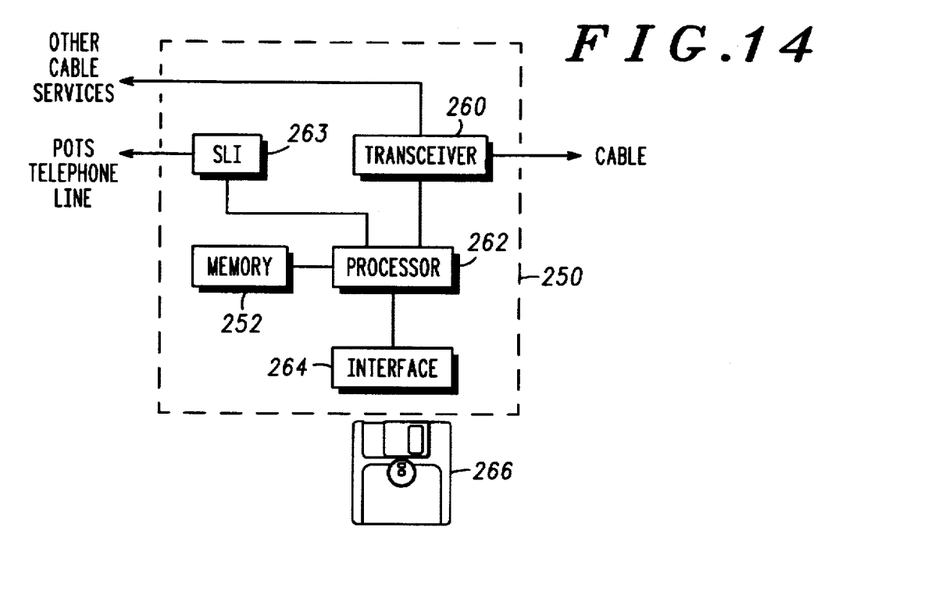
FIG. 14 is a block diagram of a cable access unit.

FIG. 14 is a block diagram of the cable access unit 250. The CAU 250 has a transceiver 260 coupled to the cable plant 248 and the other cable services provided to the subscriber's premise. The transceiver 260 is controlled by a processor 262. The processor 262 is coupled to the subscriber loop interface (SLI) 263. The SLI 263 converts the digital data carried over the cable plant 248 to the analog format of the plaint old telephones service (POTS) line 254. The processor 262 is coupled to the memory (machine-readable storage medium) 252. The memory 252 contains machine-readable data that the processor 262 uses to execute the methods described herein. In one embodiment the processor 262 is also connected to an interface 264. The interface 264 is operative to receive machine-readable data from an external source. The machine-readable data can be used to update the software in the memory 252. In one embodiment, the interface 264 receives a computer disk (machine-readable storage medium) 266. The computer disk 266 contains machine-readable data that is used to update the software on the memory 252. In another embodiment, the memory 252 is a semiconductor chip and contains the software instructions to execute the methods described herein.

Thus there has been described a data link control method that is able to differentiate between a new and a re-established communication link. This is facilitated by the message segmentation and reassembly method that tracks where the message left off. The graceful suspension and resumption method allows the devices to know that the link is being suspended and that this is a resumed data link. Finally, the frame structure or transmission method allows the devices to communicate efficiently to achieve these and other objectives.

While the invention has been described in conjunction with specific embodiments thereof, it is evident that many alterations, modifications, and alterations will be apparent to those skilled in the art in light of the foregoing description. Accordingly, it is intended to embrace all such alterations, modifications, and variations in the appended claims.

What is claimed is:

1. A data link control method, comprising the steps of:
   (a) receiving a message for transmission over a communications system;
   (b) determining a number of message portions in the message;
   (c) when the number of message portions is less than or equal to a predetermined number of message portions, setting a frame length equal to the number of message portions and transmitting a frame containing the message;
   (d) when the number of message portions is greater than the predetermined number of message portions, assigning a message sequence number to the frame;
   (e) assigning a first frame sequence number to the frame containing a first segment of message portions in the message; and
   (f) transmitting the frame containing the first frame sequence number.

2. The method of claim 1, wherein step (a) further includes the step of:
   (a1) receiving a message routing indicator.

3. The method of claim 1, wherein step (e) further includes the step of:
   (e1) setting a more bit.

4. The method of claim 1, further including the steps of:
   (g) assigning a next frame sequence number to the frame containing a next segment of message portions in the message;
   (h) transmitting the frame containing the next segment of message portions; and
   (i) repeating steps (g) and (h) until the number of message portions has been transmitted.

5. The method of claim 4, wherein step (g) further includes the steps of:
   (g1) determining a quantity of message portions in the next segment of message portions; and
   (g2) setting the frame length to the quantity of message portions.

6. The method of claim 4, wherein step (g) further includes the steps of:
   (g1) determining if the next segment of message portions is a last segment;
   (g2) when the next segment of message portions is not the last segment, setting a more bit; and
   (g3) when the next segment of message portions is the last segment, not setting the more bit.

7. A data link control method, comprising the steps of:
   (a) receiving a frame;
   (b) determining if the frame is an information frame;
   (c) when the frame is the information frame, reading a message sequence number and a frame sequence number;
   (d) determining if the frame sequence number is one greater than a previous frame sequence number; and
   (e) when the frame sequence number is one greater than the previous frame sequence number, appending a message payload from the frame to a previous message payload.

8. The method of claim 7, further including the step of:
   (f) when the frame sequence number is not one greater than the previous frame sequence number, transmitting a negative acknowledgment.

9. The method of claim 7, further including the steps of:
   (f) determining if a more bit is set in the frame; and
   (g) when the more bit is not set, assembling a message.

10. The method of claim 9, further including the steps of:
    (h) when the more bit is set, repeating from step (a).

11. The method of claim 9, further including the step of:
    (h) routing the message based upon a message routing identifier.

* * * * *